United States Patent
Baker et al.

(10) Patent No.: US 10,223,439 B1
(45) Date of Patent: *Mar. 5, 2019

(54) SYSTEMS AND METHODS FOR PROVIDING SEARCH QUERY REFINEMENTS

(71) Applicant: Google Inc., Mountain View, CA (US)

(72) Inventors: Steven Baker, Mountain View, CA (US); Paul Haahr, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 15/348,314

(22) Filed: Nov. 10, 2016

Related U.S. Application Data

(63) Continuation of application No. 13/955,119, filed on Jul. 31, 2013, now Pat. No. 9,495,443, which is a continuation of application No. 13/270,928, filed on Oct. 11, 2011, now Pat. No. 8,504,584, which is a continuation of application No. 10/953,117, filed on Sep. 30, 2004, now Pat. No. 8,065,316.

(51) Int. Cl.
*G06F 17/30* (2006.01)

(52) U.S. Cl.
CPC .. *G06F 17/30646* (2013.01); *G06F 17/30011* (2013.01); *G06F 17/3064* (2013.01); *G06F 17/30867* (2013.01)

(58) Field of Classification Search
CPC ......... G06F 17/30646; G06F 17/30011; G06F 17/30867; G06F 17/3064
See application file for complete search history.

(56) References Cited

U.S. PATENT DOCUMENTS

| | | | |
|---|---|---|---|
| 5,263,167 A * | 11/1993 | Conner, Jr. | G06F 17/30398 |
| 5,675,788 A * | 10/1997 | Husick | G06F 17/30017 |
| 5,790,121 A | 8/1998 | Sklar et al. | |
| 5,864,845 A | 1/1999 | Voorhees et al. | |
| 5,907,840 A | 5/1999 | Evans et al. | |
| 5,940,825 A | 8/1999 | Castelli et al. | |
| 6,006,225 A | 12/1999 | Bowman et al. | |
| 6,014,665 A | 1/2000 | Culliss | |
| 6,026,388 A | 2/2000 | Liddy et al. | |
| 6,144,958 A * | 11/2000 | Ortega | G06F 17/2725 |
| 6,169,986 B1 | 1/2001 | Bowman et al. | |
| 6,411,950 B1 | 6/2002 | Moricz et al. | |
| 6,484,162 B1 | 11/2002 | Edlund et al. | |
| 6,560,597 B1 | 5/2003 | Dhillon | |
| 6,564,202 B1 | 5/2003 | Schuetze et al. | |

(Continued)

OTHER PUBLICATIONS

Lau et al., "Patterns of Search: Analyzing and Modeling Web Query Refinement," 7.sup.th International Conference on user Modeling, Jun. 20-24, 1999 Jun. 20, 1999.

(Continued)

*Primary Examiner* — James Trujillo
*Assistant Examiner* — Hubert Cheung
(74) *Attorney, Agent, or Firm* — Middleton Reutlinger

(57) ABSTRACT

A system and method for generating query refinement suggestions may include collecting refinement data for at least one received source query. The collected refinement data is then clustered to form at least one cluster. At least one potential refinement query suggestion is identified from the refinement data within the at least one cluster.

13 Claims, 10 Drawing Sheets

(56) References Cited

U.S. PATENT DOCUMENTS

| | | | |
|---|---|---|---|
| 6,574,624 B1 * | 6/2003 | Johnson | G06F 17/3064 |
| | | | 707/750 |
| 6,668,251 B1 | 12/2003 | Goldberg | |
| 6,671,681 B1 | 12/2003 | Emens et al. | |
| 6,678,679 B1 | 1/2004 | Bradford | |
| 6,701,309 B1 | 3/2004 | Beeferman | |
| 6,772,150 B1 | 8/2004 | Whitman et al. | |
| 6,882,994 B2 | 4/2005 | Yoshimura et al. | |
| 7,010,521 B2 | 3/2006 | Hinshaw et al. | |
| 7,028,020 B1 | 4/2006 | Keskar et al. | |
| 7,051,023 B2 | 5/2006 | Kapur et al. | |
| 7,058,622 B1 | 6/2006 | Tedesco | |
| 7,092,936 B1 | 8/2006 | Alonso et al. | |
| 7,096,218 B2 | 8/2006 | Schirmer et al. | |
| 7,277,854 B2 * | 10/2007 | Bennett | G06F 17/3043 |
| | | | 704/257 |
| 7,430,717 B1 | 9/2008 | Spangler | |
| 7,519,605 B2 | 4/2009 | Vailaya et al. | |
| 7,739,274 B2 | 6/2010 | Curtis et al. | |
| 7,779,349 B2 | 8/2010 | Spangler | |
| 7,814,096 B1 | 10/2010 | Roy | |
| 7,890,526 B1 | 2/2011 | Brewer et al. | |
| 8,065,316 B1 | 11/2011 | Baker et al. | |
| 8,082,264 B2 | 12/2011 | Bierner | |
| 8,086,619 B2 | 12/2011 | Haahr et al. | |
| 8,135,729 B2 | 3/2012 | Brewer et al. | |
| 2002/0103798 A1 * | 8/2002 | Abrol | G06F 17/30616 |
| 2002/0147724 A1 * | 10/2002 | Fries | G06F 17/30864 |
| 2002/0169764 A1 | 11/2002 | Kincaid et al. | |
| 2003/0110181 A1 | 6/2003 | Schuetze et al. | |
| 2003/0154072 A1 * | 8/2003 | Young | G06F 17/30017 |
| | | | 704/9 |
| 2003/0187837 A1 | 10/2003 | Culliss | |
| 2004/0019588 A1 | 1/2004 | Doganata et al. | |
| 2004/0068486 A1 | 4/2004 | Chidlovskii | |
| 2004/0153456 A1 * | 8/2004 | Charnock | G06F 17/30389 |
| 2004/0186827 A1 | 9/2004 | Anick et al. | |
| 2004/0236736 A1 | 11/2004 | Whitman et al. | |
| 2004/0249808 A1 | 12/2004 | Azzam et al. | |
| 2005/0055341 A1 | 3/2005 | Haahr et al. | |
| 2005/0216446 A1 | 9/2005 | Hall | |
| 2005/0234972 A1 | 10/2005 | Zeng et al. | |
| 2005/0278321 A1 | 12/2005 | Vailaya et al. | |
| 2005/0289141 A1 * | 12/2005 | Baluja | G06F 17/2735 |
| 2006/0036438 A1 * | 2/2006 | Chang | G10L 15/26 |
| | | | 704/235 |
| 2006/0064411 A1 * | 3/2006 | Gross | G06F 17/30864 |
| 2007/0239671 A1 | 10/2007 | Whitman et al. | |
| 2008/0215314 A1 | 9/2008 | Spangler | |
| 2011/0071827 A1 * | 3/2011 | Lee | G06F 17/30654 |
| | | | 704/235 |
| 2012/0054216 A1 | 3/2012 | Haahr et al. | |

OTHER PUBLICATIONS

Rasmussen, "Chapter 16: Clustering Algorithms," University of Pittsburgh, Information Retrieval, 1992, pp. 419-441 Jan. 1992.
Scholer et al., "Query Association for Effective Retrieval," School of Computer Science and Information Technology, RMIT University, Melbourne, Australia, 2002, pp. 324-331 Jan. 2002.

* cited by examiner

SYSTEMS AND METHODS FOR PROVIDING SEARCH QUERY REFINEMENTS

RELATED APPLICATIONS

This application is a continuation of U.S. application Ser. No. 13/955,119, filed Jul. 31, 2013 (now U.S. Pat. No. 9,495,443), which is a continuation of U.S. application Ser. No. 13/270,928, filed Oct. 11, 2011 (now U.S. Pat. No. 8,504,584), which is a continuation of U.S. patent application Ser. No. 10/953,117, filed Sep. 30, 2004 (now U.S. Pat. No. 8,065,316).

FIELD OF THE INVENTION

The present invention relates in general to query processing and, in particular, to a system and method for providing search query refinements.

BACKGROUND OF THE INVENTION

Although the Internet traces back to the late 1960s, the widespread availability and acceptance of personal computing and internetworking have resulted in the explosive growth and unprecedented advances in information sharing technologies. In particular, the Worldwide Web ("Web") has revolutionized accessibility to untold volumes of information in stored electronic form to a worldwide audience, including written, spoken (audio) and visual (imagery and video) information, both in archived and real-time formats. In short, the Web has provided desktop access to every connected user to a virtually unlimited library of information in almost every language worldwide.

Search engines have evolved in tempo with the increased usage of the Web to enable users to find and retrieve relevant Web content in an efficient and timely manner. As the amount and types of Web content have increased, the sophistication and accuracy of search engines have likewise improved. Generally, search engines strive to provide the highest quality results in response to a search query. However, determining quality is difficult, as the relevance of retrieved Web content is inherently subjective and dependent upon the interests, knowledge and attitudes of the user.

Existing methods used by search engines are based on matching search query terms to terms indexed from Web pages. More advanced methods determine the importance of retrieved Web content using, for example, a hyperlink structure-based analysis, such as described in S. Brin and L. Page, "The Anatomy of a Large-Scale Hypertextual Search Engine," (1998) and in U.S. Pat. No. 6,285,999, issued Sep. 4, 2001 to Page.

A typical search query scenario begins with a search query being submitted to a search engine. The search engine executes a search against a data repository of potentially retrievable Web content and identifies the candidate Web pages. Searches can often return thousands or even millions of results, so most search engines typically rank or score the results to obtain only the most promising results. The top Web pages are then presented to the user, usually in the form of Web content titles, hyperlinks, and other descriptive information, such as snippets of text taken from the Web pages.

Providing quality search results can be complicated by the literal and implicit scope of the search query itself. A poorly-framed search query could be ambiguous or be too general or specific to yield responsive and high quality search results. For instance, terms within a search query can be ambiguous at a syntactic or semantic level. A syntactic ambiguity can be the result of an inadvertent homonym, which specifies an incorrect word having the same sound and possibly same spelling, but different meaning from the word actually meant. For example, the word "bear" can mean to carry or can refer to an animal or an absence of clothing. A semantic ambiguity can be the result of improper context. For example, the word "jaguar" can refer to an animal, a version of the Macintosh operating system, or a brand of automobile. Similarly, search terms that are too general result in overly broad search results while search terms that are too narrow result in unduly restrictive and non-responsive search results.

Accordingly, there is a need for an approach to providing suggestions for search query refinements that will resolve ambiguities, over generalities, or over specificities occurring in search queries. Preferably, such an approach would provide refined search queries that, when issued, result in search results closely related to the actual topic underlying the intent of the original search query and provide suggestions that reflect conceptual independence and clear meanings as potential search terms.

SUMMARY OF THE INVENTION

According to one aspect, a method for generating query refinement suggestions may include collecting refinement data for at least one received source query; clustering the collected refinement data to form at least one cluster; and identifying at least one potential refinement query suggestion from the refinement data within the at least one cluster.

According to still another aspect a method includes reviewing historical query data to identify source queries and associated refinement queries to generate refinement data. The refinement data includes a number of source query/refinement query associations. The method further includes clustering the refinement data to form at least one cluster and identifying at least one potential refinement query suggestion from the refinement data within the at least one cluster.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Overview

The quantity of documents becoming searchable via search engines is substantially increasing. Accordingly, search queries which may be submitted to locate relevant documents may more easily suffer from potential ambiguities or generalities. It is beneficial to identify and provide search query refinements which may remedy the initial query deficiencies. As described herein, search query refinements may be generated and suggested to assist the user in more quickly and more accurately identifying desirable search results. More specifically, refinement data may be collected based on a received source query. The collected refinement data may be grouped and scored to identify potential refinement suggestions.

Exemplary Network Configuration

Figure 1:
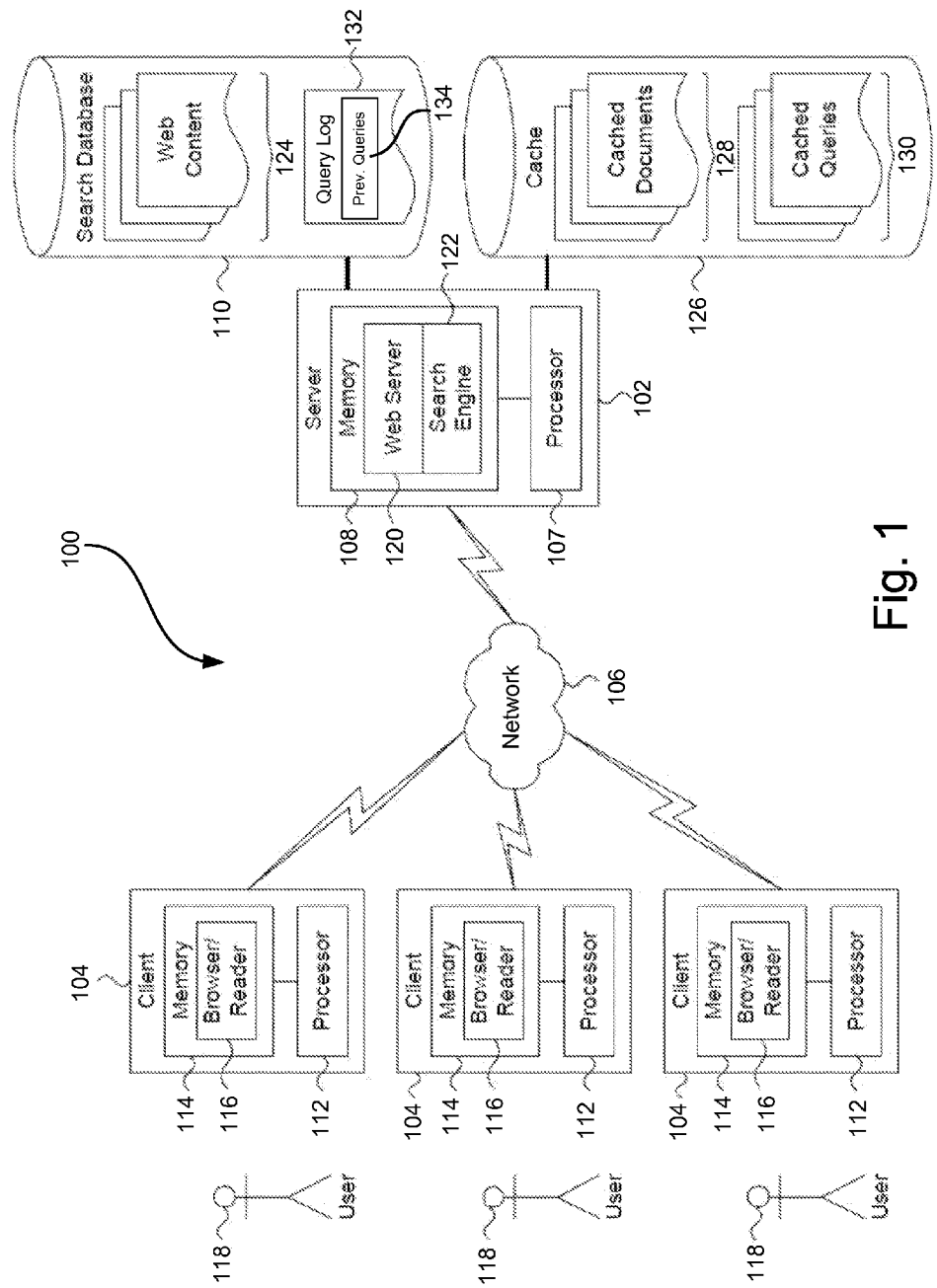
FIG. 1 is an exemplary diagram of a network in which systems and methods consistent with the principles of the invention may be implemented.

FIG. 1 is a block diagram showing a system 100 for providing search query refinements, in accordance with the present invention. System 100 may include multiple individual clients 104 communicatively interfaced to a server 102 via a network 106, such as the Internet, or other form of communications network, as would be recognized by one skilled in the art. Individual clients 104 may be operated by users 118 who transact requests for Web content and other operations through their respective client 104. Three clients 104 and one server 102 have been illustrated as connected to network 106 for simplicity. In practice, there may be more or fewer clients and servers. Also, in some instances, a client may perform the functions of a server and a server may perform the functions of a client.

In general, each client 104 can be any form of computing platform connectable to a network, such as network 106, and capable of interacting with application programs. Exemplary examples of individual clients include, without limitation, personal computers, digital assistants, "smart" cellular telephones and pagers, lightweight clients, workstations, "dumb" terminals interfaced to an application server, and various arrangements and configurations thereof, as would be recognized by one skilled in the art. Network 106 may include various topologies, configurations, and arrangements of network interconnectivity components arranged to interoperatively couple with enterprise, wide area and local area networks and include, without limitation, conventionally wired, wireless, satellite, optical, and equivalent network technologies, as would be recognized by one skilled in the art. Server 102 may include server entities that gather, process, search, and/or maintain documents in a manner consistent with the principles of the invention.

For Web content exchange and, in particular, to transact searches, each client 104 may execute a Web browser application 116 ("Web browser"), which preferably implements a graphical user interface and through which search queries are sent to a Web server 120 executing on the server 102. Typically, each search query describes or identifies information, generally in the form of Web content, which is potentially retrievable via the Web server 102. The search query provides search characteristics, typically expressed as individual terms, such as keywords and the like, and attributes, such as language, character encoding and so forth, which enables a search engine 122, also executing on the server 102, to identify and send back search result documents, generally in the form of Web pages. Other styles, forms or definitions of search queries and characteristics are feasible, as would be recognized by one skilled in the art.

In response to search engine execution, the Web pages may be sent back to Web browser 116 for presentation, usually in the form of Web content titles, hyperlinks, and other descriptive information, such as snippets of text taken from the Web pages. The user may then view or access the Web pages on the graphical user interface and can input selections and responses in the form of typed text, clicks, or both. In one implementation, server 102 maintains a search database 110 in which Web content 124 is maintained. In an alternative embodiment, Web content 124 may also be maintained remotely on other Web servers (not shown) interconnected either directly or indirectly via the network 106 and which are preferably accessible by each client 104. In a further embodiment, server 102 may maintain a cache 126 in which cached documents 128 and cached queries 130 are maintained. More specifically, cache 126 associates each cached document 128 with one or more cached queries 130 to improve searching performance, as is known in the art. Finally, in a still further embodiment, search engine 122 may maintain a query log 132 in which records of previous search queries 134 are tracked.

In one embodiment consistent with principles of the invention, search engine 122 preferably identifies Web content 124 best matching the search characteristics to provide high quality Web pages. In identifying matching Web content 124, search engine 122 operates on information characteristics describing potentially retrievable Web content. Note the functionality provided by server 120, including Web server 120 and search engine 122, could be provided by a loosely- or tightly-coupled distributed or parallelized computing configuration, in addition to a uniprocessing environment.

A "document," as the term is used herein, is to be broadly interpreted to include any traditional printed work of authorship, such as books, magazines, catalogs, newspapers, articles, etc. A "web document," as the term is used herein, is to be broadly interpreted to include any machine-readable and machine-storable work product available via a network, such as network 106. A web document may include, for example, a web site, a file, a combination of files, one or more files with embedded links to other files, a news group posting, a blog, a web advertisement, etc. In the context of the Internet, a common web document is a web page. Web pages often include textual information and may include embedded information (such as meta information, images, hyperlinks, etc.) and/or embedded instructions (such as Javascript, etc.). A "link," as the term is used herein, is to be broadly interpreted to include any reference to or from a web document.

Search queries can potentially be ambiguous or lack generality or specificity. Such poorly-framed search queries can be remedied through search query refinements, which can be provided in response to search query issuances. In accordance with one aspect of the invention, search query refinements may be generated and suggested to assist the user in more quickly and more accurately identifying desirable Web content 124.

Figure 12:
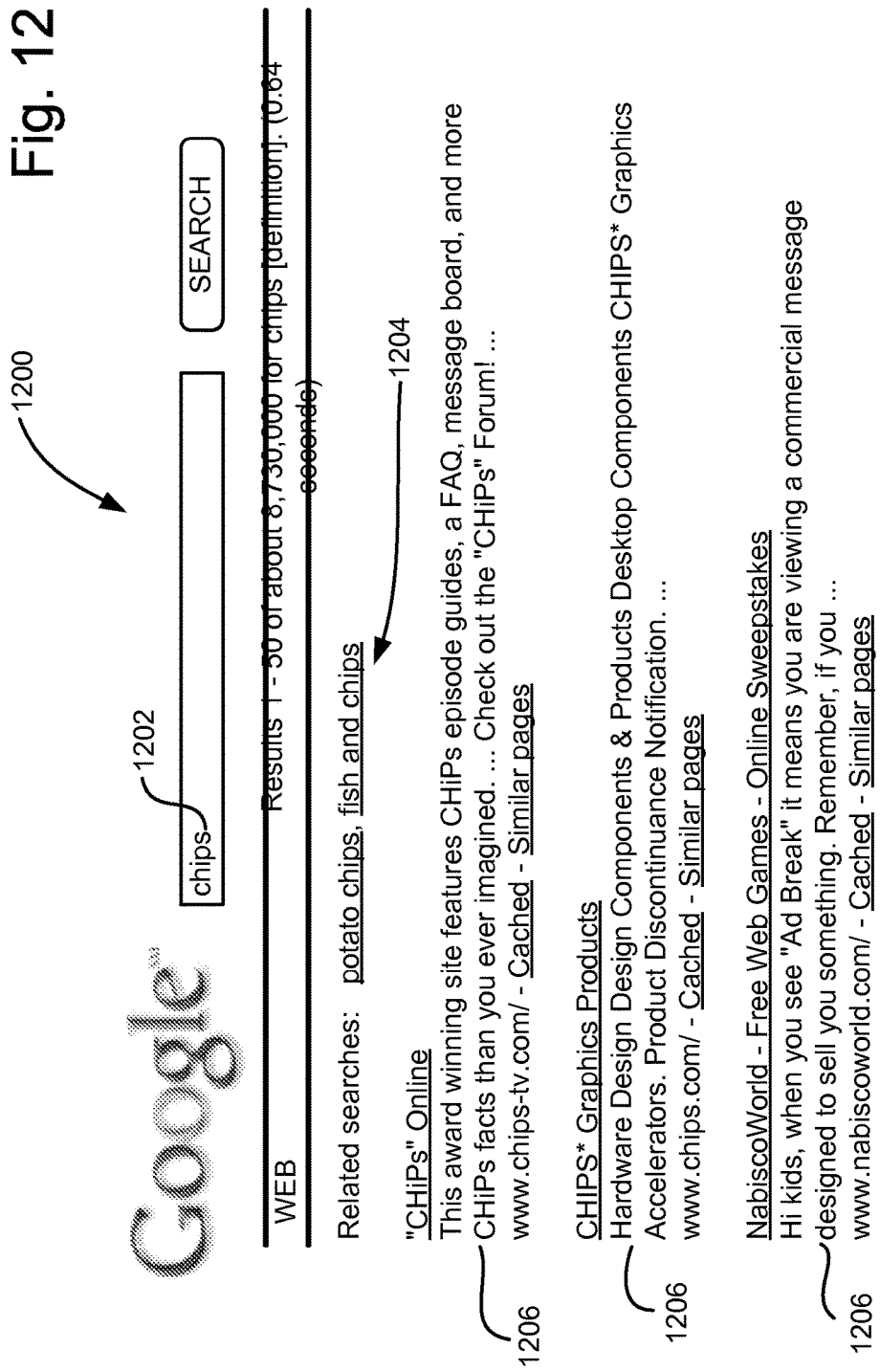
FIG. 12 is an exemplary diagram of a graphical user interface containing refinement query suggestions may be presented according to one implementation consistent with principles of the invention.

FIG. 12 is an exemplary diagram of a graphical user interface 1200 containing results of a search performed on an initial source query 1202 according to an implementation consistent with the present invention. In this example, a search on initial source query 1202 has resulted in a number of refinement suggestions 1204 being initially presented to the user. By clicking on any of the underlined query refinement suggestions 1204, the user may perform a search on the selected suggestion, thereby refining their search. In addition to refinement suggestions 1204, conventional search results 1206 indicative of web content 124 may also be provided.

The individual computer systems, including server 102 and clients 104, include general purpose, programmed digital computing devices consisting of a central processing unit (processors 107 and 112, respectively), random access memory (memories 108 and 114, respectively), non-volatile secondary storage, such as a hard drive or CD ROM drive, network or wireless interfaces, and peripheral devices, including user interfacing means, such as a keyboard and display. Program code, including software programs, and data is loaded into the RAM for execution and processing by the CPU and results are generated for display, output, transmittal, or storage. Web browser 116 may be an HTTP-compatible Web browser, such as the Internet Explorer, licensed by Microsoft Corporation, Redmond, Wash.; Navigator, licensed by Netscape Corporation, Mountain View, Calif.; or other forms of Web browsers, as are known in the art.

Exemplary Client/Server Architecture

Figure 2:
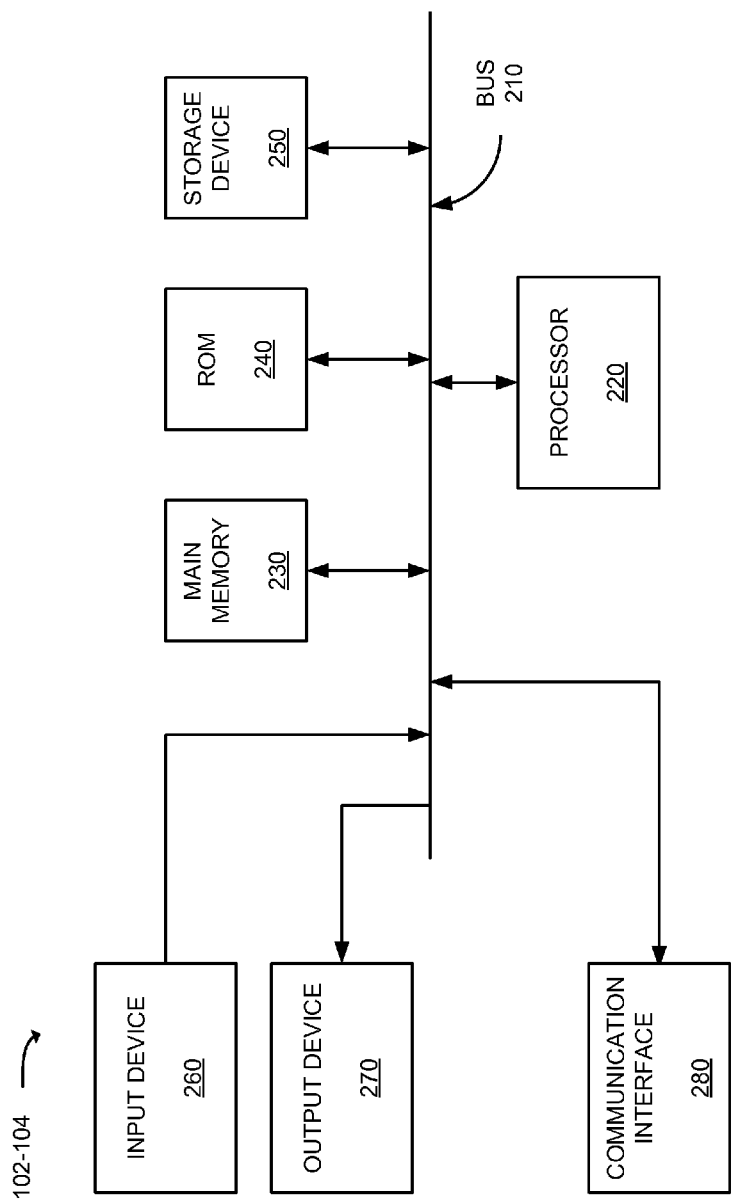
FIG. 2 is an exemplary diagram of a client or server of FIG. 1 according to an implementation consistent with the principles of the invention.

FIG. 2 is an exemplary diagram of a client or server entity (hereinafter called "client/server entity"), which may correspond to one or more of clients 104 and server 102, according to an implementation consistent with the principles of the invention. The client/server entity may include a bus 210, a processor 220, a main memory 230, a read only memory (ROM) 240, a storage device 250, an input device 260, an output device 270, and a communication interface 280. Bus 210 may include a path that permits communication among the elements of the client/server entity.

Processor 220 may include a conventional processor, microprocessor, or processing logic that interprets and executes instructions. Main memory 230 may include a random access memory (RAM) or another type of dynamic storage device that may store information and instructions for execution by processor 220. ROM 240 may include a conventional ROM device or another type of static storage device that may store static information and instructions for use by processor 220. Storage device 250 may include a magnetic and/or optical recording medium and its corresponding drive.

Input device 260 may include a conventional mechanism that permits an operator to input information to the client/server entity, such as a keyboard, a mouse, a pen, voice recognition and/or biometric mechanisms, etc. Output device 270 may include a conventional mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 150.

As will be described in detail below, the client/server entity, consistent with the principles of the invention, may perform certain searching-related operations. The client/server entity may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing

Figure 3:
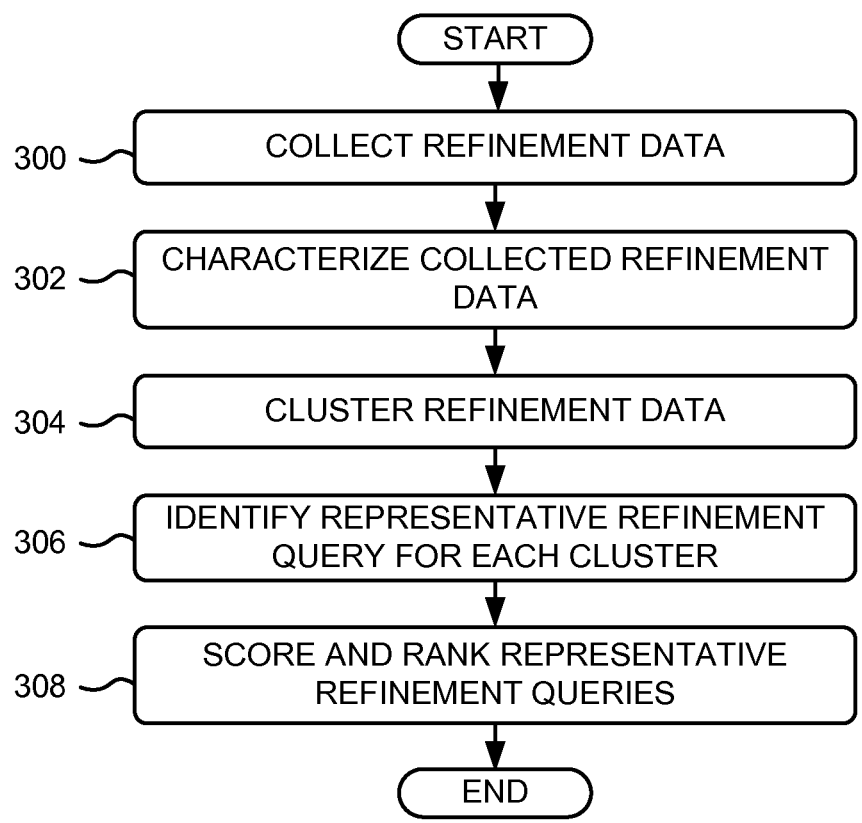
FIG. 3 is a flow diagram of exemplary processing for providing search query refinements in response to a received user query according to an implementation consistent with the principles of the invention.

FIG. 3 is a flow diagram of exemplary processing for providing search query refinements in response to a received user query according to an implementation consistent with the principles of the invention. Initially, refinement data is collected for plurality of source queries (act 300). Additional details regarding the refinement data collection process will be set forth in detail below with respect to FIG. 4. Following collection, the collected refinement data is characterized for each source query (act 302). In one implementation consistent with principles of the invention, refinement data may be characterized by creating composite term vectors representing documents returned by refinement queries. Additional details regarding the characterization process will be set forth in detail below with respect to FIGS. 5-6.

Once the refinement data for each source query has been characterized, potential refinement queries identified from the refinement data may be clustered based upon the composite term vectors of act 302 (act 304). In this manner, potential refinement queries are grouped into related clusters. Additional details regarding the clustering process will be set forth in detail below with respect to FIG. 7. Next, the most representative refinement from each cluster identified in act 304 is identified (act 306). Additional details regarding the clustering process will be set forth in detail below with respect to FIG. 8. In one exemplary implementation, selecting representative refinements for the query clusters may include choosing the refinement query from each cluster which occurs most frequently as identified during refinement data collection. Once selected, the clusters and their representative refinements are scored and ranked for presentation to users upon entry of the respective source query (act 308). Additional details regarding the scoring and ranking process will be set forth in detail below with respect to FIGS. 9 and 10. By characterizing, clustering, and scoring previously received manual refinement queries, the above-described system is able to identify the most accurate and helpful refinement queries for display to users in response to received source queries.

Figure 4:
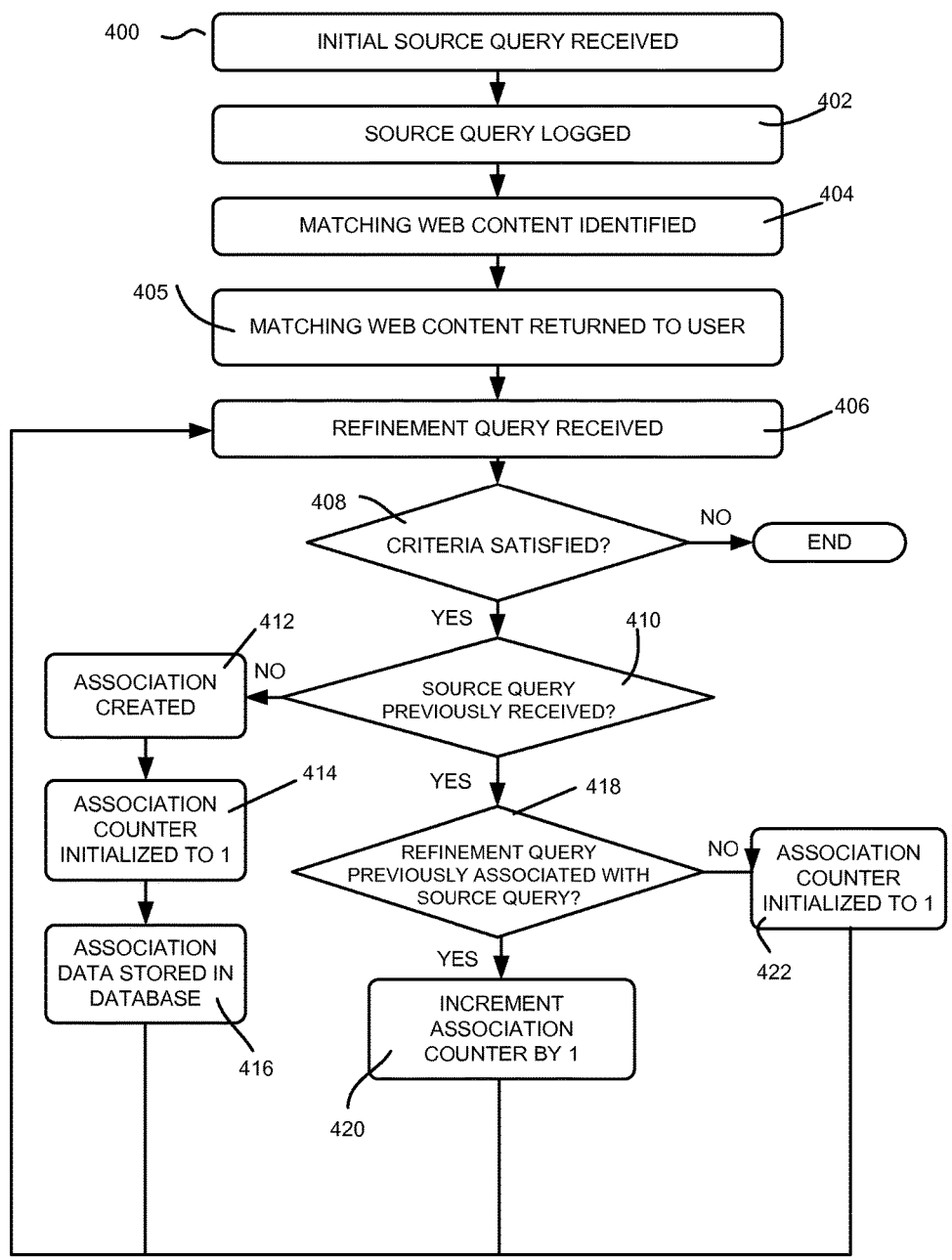
FIG. 4 is a flow diagram illustrating exemplary processing for collecting manual refinement data according to one implementation consistent with the principles of the invention.

FIG. 4 is a flow diagram illustrating exemplary processing for collecting manual refinement data initially described in act 300 set forth above. Initially, processing may begin when search engine 122 receives a search term (or a group of search terms) from a user as an initial source query for searching a document repository (act 400). In one implementation, the document repository includes documents available from the Internet and/or a database (or set of databases) and the vehicle for searching this repository is a search engine, such as search engine 122 (FIG. 1). In one embodiment, search engine 122 may receive the source query via web browser software 116 on a client, such as client 104 (FIG. 1). Upon receipt of an initial source query, search engine 122 logs the source query in query log 132 (act 402) and identifies Web content 124 that best matches the query (act 404). Server 102 then returns the identified Web content 124 to client 104 as an initial results set (act 405).

As described above, providing quality search results can be complicated by the literal and implicit scope of the search query. Accordingly, users may wish to refine an initial source query in order resolve ambiguities, over-generalities, or over specificities occurring in properly framed search queries. Preferably, such an approach would provide refined search queries that lead to better search results for the user. Ideally, the refined search queries should be conceptually independent and have clear meaning as potential search terms.

In accordance with this manual query refinement process, search engine 122 may receive an additional query ("refinement query") from the user upon viewing the initially returned results set (act 406). It may next be determined whether a predetermined criteria has been satisfied indicating that the additional received query is likely a refinement query to the initial source query (act 408). In one implementation consistent with principles of the invention, one such criteria may be include a predetermined time limit based upon the receipt of the initial source query. One such exemplary time limit may be two minutes, however any suitable time limit may be used, such that queries received within the time limit are likely to correspond to refinements of the initial source query.

If the criteria has been satisfied, search engine 122 next determines whether the initial source query has been previously received (act 410). If not, an association is created between the received refinement query and the initially received source query (act 412). Next, a counter associated with the refinement query is initialized to 1 indicating a first instance of a source query and subsequent refinement query (act 414). Next, the associated source and refinement queries are stored in database 110 for subsequent usage described below (act 416). However, if the initial source query had been previously received, search engine 122 determines whether the refinement query has been previously received as a refinement to the initial source query (act 418). If so, a counter associated with the refinement query is incremented to indicate the additionally received refinement query (act 420). If the refinement query has not been previously received as a refinement to the initial source query the counter associated with the refinement query is initialized to 1 indicating a first instance of a received refinement query (act 422). The process then returns to act 406 for receipt of the next refinement query (if any). The results of the repeated steps thereby populate database 110 with a plurality of source query/refinement query associations for subsequent usage in generating accurate suggested refinement queries. In one implementation consistent with principles of the invention, multiple receipts of the same initial source query result in incremented count totals for the respective refinement queries. These count totals may be subsequently used in clustering and scoring the potential refinement queries to identify refinement queries suitable for presentation to users.

Figure 5:
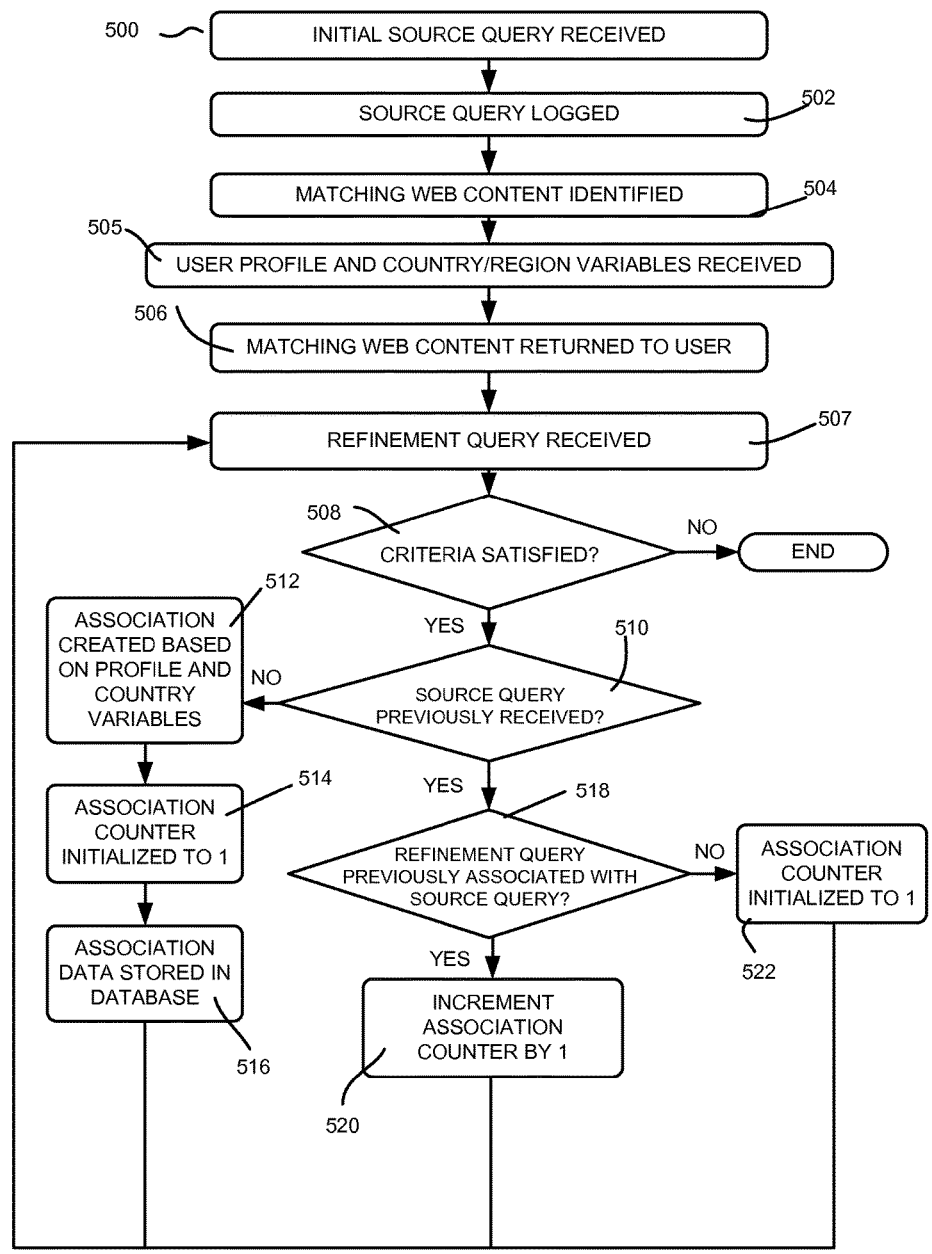
FIG. 5 is a flow diagram illustrating exemplary processing for collecting manual refinement data according to another implementation consistent with the principles of the invention.

FIG. 5 is a flow diagram illustrating an alternative implementation of processing for collecting manual refinement data. Initially, processing may begin when search engine 122 receives a search term (or a group of search terms) from a user as an initial source query for searching a document repository (act 500). Upon receipt of an initial source query, search engine 122 logs the source query in query log 132 (act 502) and identifies Web content 124 that best matches the query (act 504). Search engine 122 may also identify user profile or interface information that may be used to further refine returned results (act 505). In one implementation consistent with principles of the invention, user profile or interface information may include language preference (e.g., English, Spanish, etc.) or country/region interface (e.g., USA, Japan, China, etc.) variables. Server 102 then returns the identified Web content 124 to client 104 as an initial results set (act 506).

As described above, search engine 122 may then receive an additional query ("refinement query") from the user upon viewing the initially returned results set (act 507). It may next be determined whether a predetermined criteria has been satisfied indicating that the additional received query is likely a refinement query to the initial source query (act 508).

If the criteria has been satisfied, search engine 122 next determines whether the initial source query, including its associated user profile or country/region interface variables, has been previously received (act 510). If not, an association is created between the received refinement query and the initially received source query based on the received source query, refinement query, and user profile or country/region interface variables (act 512). Next, a counter associated with the refinement query is initialized to 1 indicating a first instance of a source query and subsequent refinement query (act 514). Next, the associated source and refinement queries are stored in database 110 for subsequent usage described below (act 516).

If the initial source query had been previously received, search engine 122 then determines whether the refinement query has been previously received as a refinement to the initial source query having matching user profile and/or country interface variables (act 518). If so, a counter associated with the refinement query is incremented to indicate the additionally received refinement query (act 420). If the refinement query has not been previously received as a refinement to the initial source query the counter associated with the refinement query is initialized to 1 indicating a first instance of a received refinement query (act 422). The process then returns to act 506 for receipt of the next refinement query (if any). By basing stored associations on user profile and/or country interface variables, subsequent distinctions to refinement data may be made which enable data more specific to a source query to be used in generating refinement suggestions.

Figure 6:
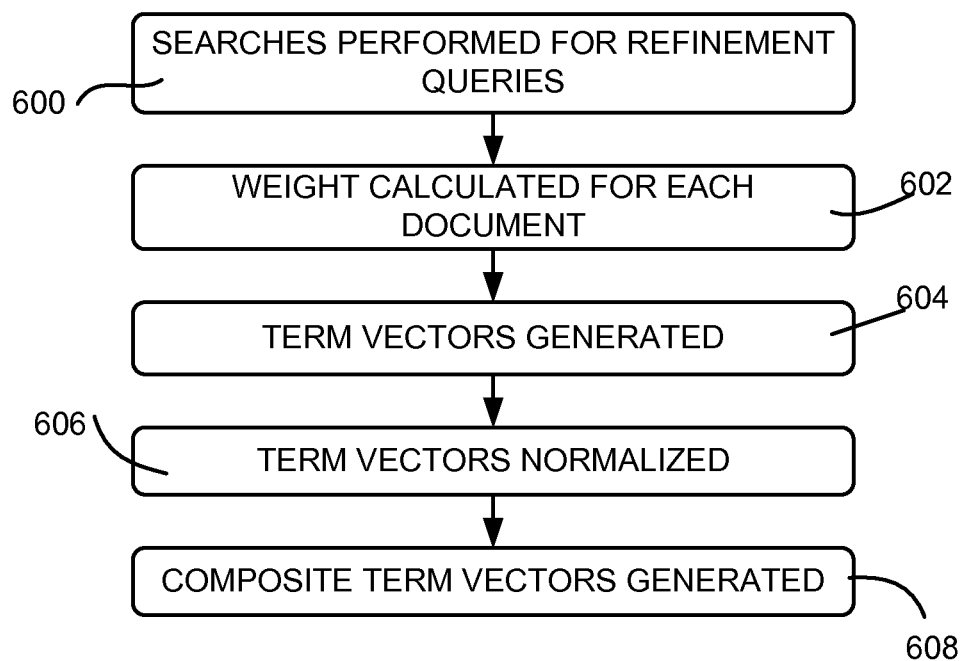
FIG. 6 is a flow diagram illustrating exemplary processing for characterizing refinement data according to one implementation consistent with the principles of the invention.

FIG. 6 is a flow diagram illustrating one exemplary implementation of processing for characterizing refinement data described briefly above with respect to act 302. The characterization process may begin by performing searches for each refinement query collected in act 300 and more specifically illustrated in FIG. 4 to generate refinement query result sets including one or more documents (act 600). As described above with respect to FIG. 5, the received refinement queries may be stored based on user profile and country/region variables to facilitate additional specificity in generating refinement suggestions. Next, for each document returned in a refinement query result set, a weight is identified for each term appearing in the document (act 602). Term weights may be calculated using a number of possible techniques. One exemplary technique for generating weights bases the weights on the number of occurrences of each term within each returned document. That is, for a term occurring three times within a returned document, a weight of 3 may be assigned. More advanced weighting techniques, such as a weight based on the inverse document frequency (idf), may also be used.

The inverse document frequency (idf) of a term may be defined as a function of the number $f$ of documents in the collection in which the term occurs and the number J of documents in the collection. In the context of a web search engine, the collection may refer to the set of web documents (e.g., web pages) indexed by the search engine. More specifically, the idf may be defined as log $$\left(\frac{J}{f+1}\right).$$

Higher idf values indicate that a term is relatively more important than a term with a lower idf value. For a web search engine, J may be on the order of 1 billion documents.

If tf is the frequency (i.e., the number of occurrences) of the term in a document, then w(tf) may be the tf weight of the term in that document. More specifically, w(tf) may be just the tf itself, or 1+log(tf), or tf/(1+tf), or any other formulation. The weight of a term for any particular document of the M documents may be defined as:

w(tf)·idf,     (1)

With this weighting technique, terms used multiple times or in multiple documents are given more weight than terms used once. Also, terms that are relatively less common are given more weight.

Following term weighting, a term vector is generated for each document returned in act 600 (act 604). In accordance with one implementation consistent with principles of the invention, term vectors may be defined as normalized vectors projected into multi-dimensional space, with each dimension corresponding to a distinct term found in a document returned in a result set associated with one of the refinement queries. Terms may be individual words or word combination. The length of each term vector in each dimension equals the sum of the weights of the corresponding term in each returned document.

Next, the term vectors are normalized (act 606). In one embodiment this may be a L2 norm, however, any suitable normalization methodology, such as an L1 norm may also be implemented. In one exemplary embodiment, the term vectors may be length normalized to a length of one, although other normalizations are possible, as would be recognized by one skilled in the art.

In accordance with one implementation consistent with principles of the invention, the generation of term vectors may be limited to a predetermined number of search results within each result set, for example, the top 10 or top 50 results for each query. In this manner, only the most relevant results are used to represent each query.

Once normalized, a composite term vector is generated for each result set returned in act 600 (act 608). In one implementation consistent with principles of the invention, the composite term vector may be generated by adding the individual term-vectors from all the documents in the result set for the query. This may be accomplished, for example, by summing the weights from identical terms in the each document term vector. These weights from the various results are not necessarily summed equally. Rather, each document term vector may be scaled according to the relevancy of that result to the query, as estimated by search engine 122. This enables the term vectors of highly relevant results to contribute more to the composite term vector for the query than the term vectors of less relevant results. In one implementation consistent with principles of the invention, such scaling can be accomplished by multiplying the weights in the term vector in each result by the search engine's relevancy score for the respective document. It should be understood that the specifics of generating a relevancy score may include any number of methodologies. In an alternative embodiment, the weights of each result may be divided by that result's position a result set ranking. For example, weights for terms within the first result would be divided by one, weights for terms within the second result would be divided by two, etc.

In one implementation consistent with principles of the invention, once the composite term vector has been generated it may be compressed and pruned by excluding those terms that have a low relative weight within the term vector. This removes what is known statistically as the "tail" of the term vector distribution.

Figure 7:
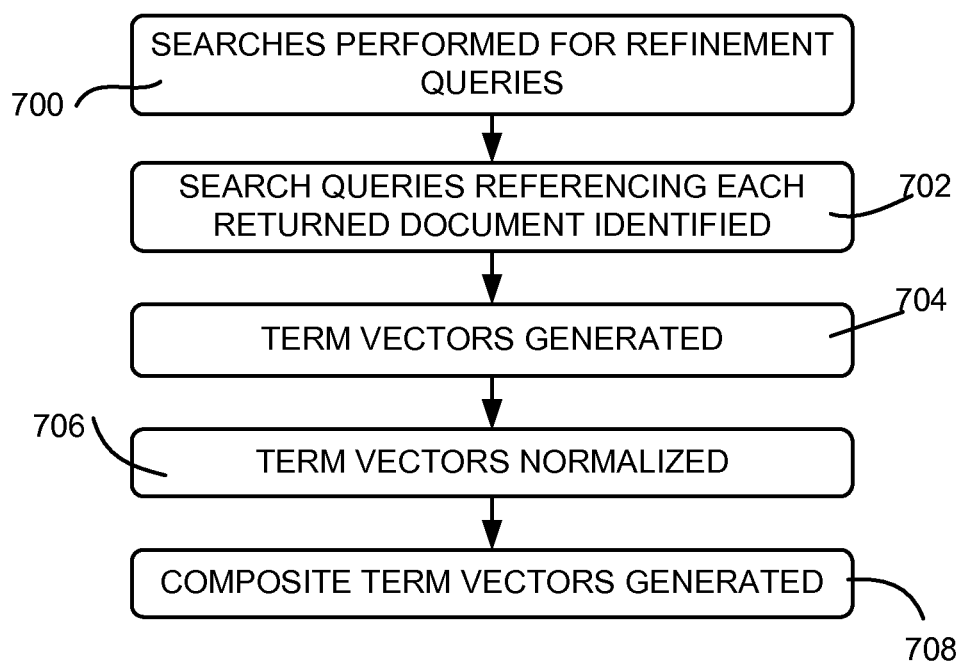
FIG. 7 is a flow diagram illustrating exemplary processing for characterizing refinement data according to another implementation consistent with the principles of the invention.

FIG. 7 is a flow diagram illustrating another exemplary implementation of processing for characterizing refinement data described briefly above with respect to act 302. The characterization process may begin by performing searches for each refinement query collected in act 300 to generate refinement query result sets including one or more documents (act 700). Next, for each search document returned in a refinement query result set, a listing of discrete search queries is identified which reference the document (act 702). For example, although document X may be returned in response to source query Y, it may also be returned in response to queries Q-U. The terms within each referencing query may also be used to characterize the collected refinement data.

Following identification of each search query referencing each returned document, a term vector is created for each document based upon the terms in the identified queries which reference the document (act 704). As with the embodiment of FIG. 5, term vectors may be defined as normalized vectors projected into multi-dimensional space, with each dimension corresponding to a distinct term found in a referencing query. Terms may be individual words or word combinations. The length of each term vector in each dimension equals the sum of the weights of the corresponding term in the referencing queries. Query term weighting may be performed in a similar manner as that describe above with respect to FIG. 5.

Next, the term vectors are normalized (act 706) and a composite term vector is generated for each result set returned in act 700 (act 708). As above, with respect to FIG. 5, the composite term vector may be compressed and pruned by excluding those terms that have a low relative weight within the term vector.

Figure 8:
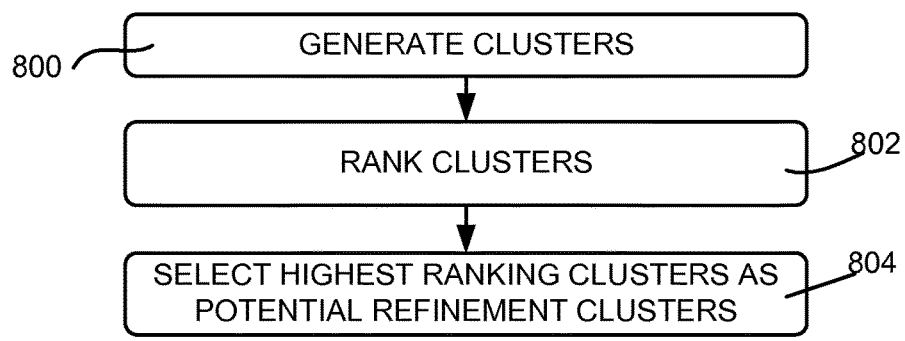
FIG. 8 is a flow diagram illustrating exemplary processing for clustering refinement queries according to one implementation consistent with the principles of the invention.

FIG. 8 is a flow diagram illustrating one exemplary embodiment of processing for clustering refinement queries based on the composite term vectors generated in act 302 and described in FIGS. 6-7 above. Initially, upon generation of the composite term vectors for each refinement query identified in act 300, clusters are formed based on the distances (e.g., Euclidian distances) of each composite term vector from each other term vector (act 800). The generated clusters are then ranked based on a count total for each refinement query in the cluster (act 802). The highest ranking clusters are then selected as potential refinement clusters (act 804). In one exemplary implementation, the potential refinement clusters are selected based on a predefined threshold value, although other cluster selection criteria are possible, as would be recognized by one skilled in the art. Additionally, in one implementation consistent with principles of the invention, the clusters are formed using a hierarchical agglomerative clustering algorithm, although other known forms of clustering could also be applied, as would be recognized by one skilled in the art. By clustering the identified refinement queries, several distinct groups (clusters) of queries are produced that are topically related. Additionally, the clustering process also identifies clusters that, when compared to each other, are topically/semantically different.

Different clustering techniques may also be used to cluster the representations of the refinement queries. For example, "group average" and "single link" cluster distance metrics may be implemented. Moreover, alternative clustering algorithms may also be implemented, including k-means clustering, spectral clustering, and clustering based on pairwise document compressibility. Multiple clustering methods may be combined in multiple stages: for example, by running hierarchical agglomerative clustering and then running k-means clustering on the output and number of clusters generated by the hierarchical agglomerative clustering.

Figure 9:
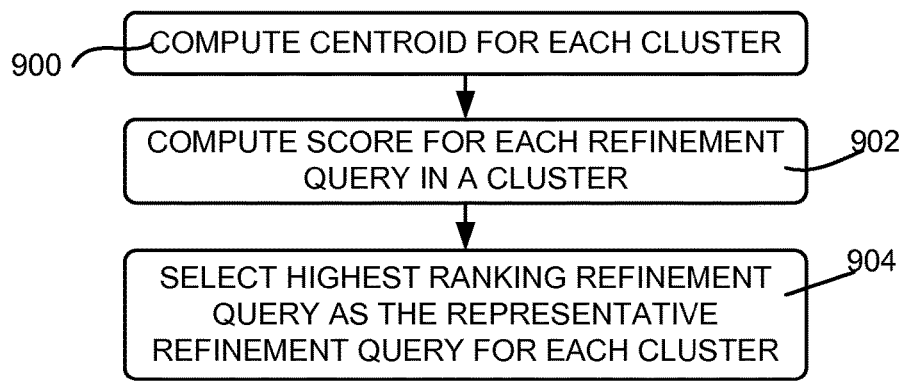
FIG. 9 is a flow diagram illustrating exemplary processing for selecting representative refinements according to one implementation consistent with the principles of the invention.

FIG. 9 is a flow diagram illustrating one exemplary implementation of processing for selecting representative refinements for the query clusters generated in act 304 and described more specifically in FIG. 8 above. As described above, each generated cluster potentially contains many refinements that are very closely related. Additionally, as described above with respect to FIG. 4, each refinement query is associated with a count, which is proportional to the probability that the user would refine the original query to that specific refinement. As discussed above with respect to FIG. 3, one exemplary implementation for selecting representative refinements for the query clusters includes choosing the refinement from each cluster having the maximum count. However, some clusters may comprise looser collections of queries than others. In these instances, the overlap of the queries isn't as tight, so a refinement that is closest in meaning to the majority of the queries in the cluster may be a better representative query than a refinement that simply has the highest probability of occurring as a refinement of the original query.

In order to account for this possibility, a centroid may be computed for each cluster (act 900). Each centroid represents the weighted center of the term vectors for each cluster, as a normalized sum of the product of the term vectors for each refinement query within the cluster and a relevance score assigned to the search documents generated in response to the refinement queries. Other approaches to computing centroids could also be used, including using unweighted values and by varying the forms of weighting and averaging, as would be recognized by one skilled in the art. Once cluster centroids have been generated, a score is computed for each refinement query in a cluster (act 902). In one implementation, the score may be based on the refinement query's count divided by the distance of its associated term vector from the centroid of the query cluster term vector. The refinement query in each cluster having the highest score is then selected as the representative refinement query (act 904).

In one alternative embodiment, various statistical measurements for the "center" or "average" of the cluster may be implemented rather than the cluster centroid defined above. More specifically, a cluster medioid may be implemented. A cluster medioid may be defined as the median of the values along all the dimensions of the term vector. Alternatively, the prior probability for each refinement query in the cluster may be combined with that refinement query's distance from the centroid using a function other than division, while still maintaining the same effect of increasing the score of a refinement that is close to the center (and more representative) of the cluster. Furthermore, a different distance function may be implemented to calculate the distance of the refinement query from the cluster center, rather than Euclidian distance as described above.

Figure 10:
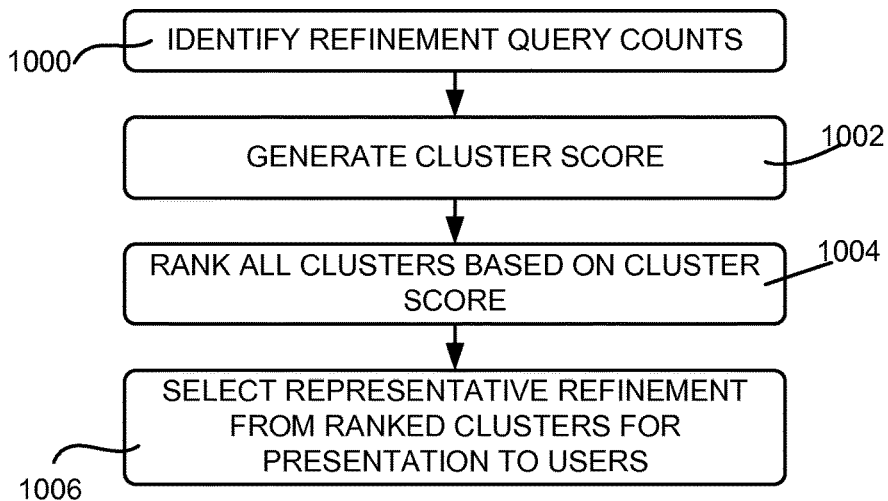
FIG. 10 and FIG. 11 are flow diagrams illustrating exemplary processing for scoring and ranking the clusters and their representative refinement query according to implementations consistent with the principles of the invention.
Figure 11:
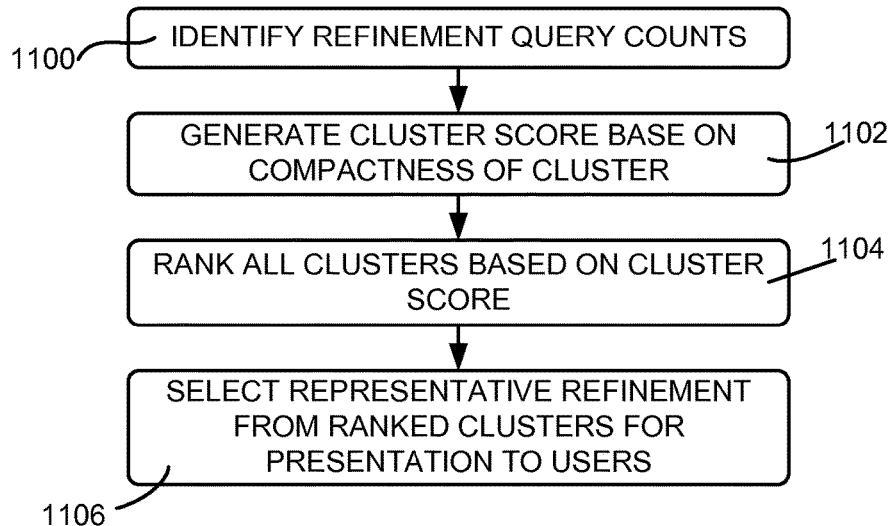

FIGS. 10 and 11 are flow diagrams illustrating exemplary implementations of processing for scoring and ranking the clusters and their representative refinement query as briefly described above in act 308. Ranking and scoring of the clusters is then used to decide which refinement queries should be displayed to the user, since even after the selecting a representative refinement query for each cluster, there may exist more refinement queries than it is possible or useful to display.

In one exemplary implementation consistent with principles of the invention, refinement query counts for all refinement queries within a cluster are identified (act 1000). Next, a cluster score is generating by summing the identified refinement query counts (act 1002). In this embodiment, the resultant number is proportional to the total probability that after typing the original query, the user would manually refine the source query to a query in that query cluster. All clusters generated may then be ranked according to their respective cluster scores (act 1004). Representative queries from a predetermined number of clusters may then be selected for display to users based on their respective rankings (act 1006).

In the implementation of FIG. 11, refinement query counts for all refinement queries within a cluster are also initially identified (act 1100). Next, a cluster score is generating by summing the identified refinement query counts and dividing by the cluster's compactness (act 1102). In one implementation consistent with principles of the invention, compactness may be defined as the standard deviation of the Euclidian distance of each refinement query term vector in the cluster from the cluster centroid. In practice, the standard deviation of refinement queries in the cluster from the centroid will be low if the cluster is a very tight cluster. Conversely, if the cluster is extremely disparate, the standard deviation will be quite high. Consequently, by dividing the score by the standard deviation, the score for clusters that are extremely tight around their centroids is elevated. Accordingly, the likelihood is increased that the higher scoring clusters have a tight coherent meaning, and are therefore more beneficial to display to users. Conversely, lower scoring clusters are more likely to contain a number of queries having high counts but which are ill-defined. The clusters are then ranked according to their respective cluster scores (act 1104). Representative queries from a predetermined number of clusters may then be selected for display to users based on their respective rankings (act 1106).

Although the standard deviation has been described above to define the compactness of a cluster, alternative methods for measuring or defining the cohesiveness or compactness of a cluster may also be implemented in accordance with principles of the invention. Additionally, prior probabilities of the refinement queries may be combined in a different fashion, so long as in general more refinements with greater probabilities yields a higher cluster score. In addition, a function may be implemented that integrates the distances of the queries in the cluster from the center and the individual queries' importance. Additionally, a count (or probability) divided by its distance from the cluster center may be computed for each refinement query in the cluster. The sum of these values for all refinement queries may then yield a similar cluster importance metric. It still has the effect that disparate clusters are downweighted and that clusters with queries with high counts are, in general, upweighted.

It should be understood that all of the above steps described with respect to FIGS. 3-11 may be performed online as a source query comes into the search engine. However, the steps may also be performed as off-line processing and the selected refinements for a given query stored in a database. In this implementation, upon receipt of a source query, selected refinements may be looked up from the database and presented to the user.

Query Refinement Example

By way of example, a user 118 might submit a search query, which includes the individual word, "bikes." This query is ambiguous because the user could have meant either bicycles or motor bikes, or various in-between variants of an unpowered or powered two wheeled vehicle. Table 1 is a listing of one example of refinement queries which may have been received following an initial source query of "bikes". Table 1 includes indicating the refinement queries received and a count representing the number of times the particular refinement was received within a predetermined timeframe (e.g., 1 day).

TABLE 1

| Refinement Query | Count |
| --- | --- |
| motorbikes | 22 |
| motorcycles | 14 |
| bmx bikes | 12 |
| mountain bikes | 8 |
| motor bikes | 8 |
| lowrider bikes | 6 |
| bicycles | 5 |
| bikes chicks | 5 |
| dirt bikes | 4 |
| cars | 4 |
| croch rockets | 4 |
| honda | 4 |
| bicicletas | 4 |
| como beijar | 4 |
| baracuda bikes | 3 |
| bikes bmx | 3 |
| bikes vancouver | 3 |
| bicycle | 3 |
| diodon holocanthus | 3 |

TABLE 1-continued

| Refinement Query | Count |
| --- | --- |
| name brand rollerblades | 3 |
| the history of the bicycle | 3 |
| kona bikes | 3 |
| sport bikes | 3 |
| kona | 3 |
| super motard | 3 |
| customized bikes | 3 |
| superbikes | 3 |
| bike sales | 3 |
| downhill biking | 3 |
| megamo | 3 |
| remote control plans | 3 |
| merlin | 3 |
| indianbikes | 2 |
| biker | 2 |
| burley bikes | 2 |
| city bikes | 2 |
| fastest bike in the world | 2 |
| costum bikes | 2 |
| mountain bikes parts | 2 |
| mopeds | 2 |
| bikes wheels | 2 |
| cycles | 2 |
| bikes movies | 2 |
| bycicles | 2 |

As shown, there is a great deal of topical overlap in many of these refinements listed in Table 1. For other examples, there may even be more distinct overlap (in particular with celebrity-based queries where there is typically at least 10 variations on "<celebrity name> photos" in the top 50 user refinements. Furthermore, user entered query refinements in general also tend to be noisy, particularly at the lower count portion of the list. As described above, refinements below a predetermined threshold may be removed from the tail of the distribution, since they are unlikely to add anything useful in accurate generating refinement queries. In one implementation, the system may use the top-N refinements (where N is 50 to 100), and also prune out refinements with extremely low counts.

Once identified, each refinement query in Table 1 is characterized by issuing the refinement query and analyzing the returned results set. So, for example, the first refinement, "motorbikes" is issued and the result set retrieved. In this instance, the result set is composed primarily of pages about motorcycles. For each of the pages or documents returned, the terms or a subset of the terms on the page are then used to create term vectors. The term vectors for all the top-N results are summed, possibly with weighting the different results, to obtain a composite term vector representative of the refinement query as whole.

Because most of the pages returned in response to the first refinement query are about motorcycles, high-weight terms in the resultant vector for the query "motorbikes" will contain terms like "motorbikes", "motor", "engine", "gasoline", "mph", etc. Similarly, the second query, "motorcycles", is issued. This also returns many pages about motorcycles, and so after collecting the result set and creating a term vector for the query, the resultant vector will have many high weight terms that are the same as the high weight terms for "motorbikes". However, for the third query in Table 1 "bmx bikes", results turn out slightly different. The results for bmx bikes are almost all about small pedal bicycles that are used to perform tricks. Thus, when the result set vectors are created and summed to form the vector for the query, the high weight terms will be different from those for "motorbikes" and "motorcycles". They will include terms like "bicycle", "pedaling", "pedal", "stunts", etc.

After the composite term vectors are generated for each refinement query, the queries are clustered, which iteratively collapses the most similar composite term vectors into similar clusters. In one implementation, a threshold may be heuristically set to indicate where the clustering is to stop. Beyond this threshold the clusters may be deemed too dissimilar to be combined. In one embodiment, the threshold may be set to be the same for all clusterings. Table 2 is a listing of the top 5 clusters generated from a fairly aggressive clustering of the refinement queries of Table 1.

TABLE 2

| | |
|---|---|
| Cluster 1: | total weight: 38 |
| motorbikes | 22 |
| motor bikes | 8 |
| bike sales | 3 |
| sport bikes | 3 |
| bikes motor | 2 |
| Cluster 2: | total weight: 24 |
| mountain bikes | 8 |
| bicycles | 5 |
| bicycle | 3 |
| bike | 2 |
| road bikes | 2 |
| mountain bikes | 2 |
| Cluster 3: | total weight: 18 |
| motorcycles | 14 |
| honda | 4 |
| Cluster 4: | total weight: 17 |
| bmx bikes | 12 |
| bikes bmx | 3 |
| bikes wheels | 2 |
| Cluster 5: | total weight: 8 |
| lowrider bikes | 6 |
| lowrider | 2 |

The remaining query clusters tend to be low-weight clusters of only one or two queries and can be removed from the analysis. As shown in Table 2, the generated clusters tend to group together topically similar refinement queries. After the clusters are generated, the best refinement from each cluster is then selected. For the above 5 clusters, if we simply choose the highest-weight (highest prior probability) refinement query, these would be: motorbikes (38); mountain bikes (24); motorcycles (18); bmx bikes (17); and lowrider bikes (8).

Note that, in some instances, highest-weight scoring doesn't always pick the most representative refinement query for each cluster. For example, for the general bicycle cluster (cluster 2), the highest weight refinement is "mountain bikes", but "bicycles" is a close second. This is why in the description of the invention given above, it is indicated that cluster weights may be scored by dividing them by the query's distance from the centroid of the cluster. In the present example, "mountain bikes" is farther from the centroid than "bicycles" since the cluster is more about bicycles in general. This has the effect of boosting the more general query "bicycles", even though it has a slightly lower weight. In this alternate system "bicycles" would be selected as the most representative refinement query rather than "mountain bikes".

Once the query refinement clusters are named, they are ranked based on the total weight of each cluster, not the weight of the selected query. In one implementation, this involves ranking the representative queries for each cluster based on the total weight of the cluster in which they are contained. As described above, in an alternative embodiment the cohesiveness of the cluster may be accounted for by dividing the total weight by the standard deviation from the centroid. The examples provided here illustrate only a few of the many techniques known to those of ordinary skill in the art that may be employed to obtain related words for a term.

CONCLUSION

Systems and methods consistent with the principles of the invention may provide refinement query suggestions in response to a received source query.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 3-10, the order of the acts may be modified in other implementations consistent with the principles of the invention. Further, non-dependent acts may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer implemented method, comprising:
   receiving, by one or more devices, an audible search query from a voice recognition system;
   identifying, by the one or more devices, a plurality of subsequent search queries that were previously received after the audible search query;
   the plurality of subsequent search queries being refinements of the audible search query;
   identifying, by the one or more devices, a first quantity of terms that occur in a first set of documents associated with a first subsequent search query of the plurality of subsequent search queries;
   the first quantity of terms being based on the audible search query;
   identifying a respective weight associated with each term of the first quantity of terms that occur in the first set of documents;
   generating, based on identifying the respective weight associated with each term of the first quantity of terms, a term vector for each document in the first set of documents;
   identifying, by the one or more devices, a second quantity of terms that occur in a second set of documents associated with a second subsequent search query of the plurality of subsequent search queries;
   the second quantity of terms being based on the audible search query;

identifying a respective weight associated with each term of the second quantity of terms that occur in the second set of documents;

generating, based on identifying the respective weight associated with each term of the second quantity of terms, a term vector for each document in the second set of documents;

selecting, by the one or more devices and based on the identified first quantity of terms and the identified second quantity of terms, the first subsequent search query or the second subsequent search query; and providing output through a speaker, by the one or more devices, the output being the selected first subsequent search query or the selected second subsequent search query as a refinement of the audible search query.

2. The computer implemented method of claim 1 further comprising:

normalizing the generated term vector for each document in the first set of documents; and normalizing the generated term vector for each document in the second set of documents.

3. The computer implemented method of claim 2 further comprising:

creating, based on normalizing the generated term vector for each document in the first set of documents and normalizing the generated term vector for each document in the second set of documents, a composite term vector.

4. The computer implemented method of claim 3 where, when selecting the first subsequent search query or the second subsequent search query, the computer implemented method includes:

selecting the first subsequent search query or the second subsequent search query using the composite term vector.

5. The computer implemented method of claim 3 further comprising:

modifying the composite term vector to exclude at least one of the first quantity of terms or the second quantity of terms that does not satisfy a particular threshold value.

6. The computer implemented method of claim 1 where, when selecting the first subsequent search query or the second subsequent search query, the computer implemented method includes:

selecting the first subsequent search query or the second subsequent search query based on a frequency of occurrence associated with the first subsequent search query and a frequency of occurrence associated with the second subsequent search query.

7. A system comprising:

one or more memory devices to store instructions;

one or more processors to execute the instructions to:

receive by the one or more devices an audible search query from a voice recognition system;

identify, by the one or more devices, a plurality of subsequent audible search queries that were previously received after the audible search query;

the plurality of subsequent search queries being refinements of the audible search query;

identify a first quantity of terms that occur in a first set of documents associated with a first subsequent search query of the plurality of subsequent search queries, the first quantity of terms being based on the audible search query;

identify a respective weight associated with each term of the first quantity of terms that occur in the first set of documents;

generate, based on identifying the respective weight associated with each term of the first quantity of terms, a term vector for each document in the first set of documents;

identify a second quantity of terms that occur in a second set of documents associated with a second subsequent search query of the plurality of subsequent search queries, the second quantity of terms being based on the audible search query;

identify a respective weight associated with each term of the second quantity of terms that occur in the second set of documents;

generate, based on identifying the respective weight associated with each term of the second quantity of terms, a term vector for each document in the second set of documents;

select, based on the identified first quantity of terms and the identified second quantity of terms, the first subsequent search query or the second subsequent search query; and provide output through a speaker, by the one or more devices, the output being the selected first subsequent search query or the selected second subsequent search query as a refinement of the audible search query.

8. The system of claim 7 where the one or more processors are further to:

normalize the generated term vector for each document in the first set of documents; and normalize the generated term vector for each document in the second set of documents.

9. The system of claim 8 where the one or more processors are further to:

create, based on normalizing the generated term vector for each document in the first set of documents and normalizing the generated term vector for each document in the second set of documents, a composite term vector.

10. The system of claim 9 where, when selecting the first subsequent search query or the second subsequent search query, the one or more processors are further to:

select the first subsequent search query or the second subsequent search query using the composite term vector.

11. The system of claim 9 where the one or more processors are further to:

modify the composite term vector to exclude at least one of the first quantity of terms or the second quantity of terms that does not satisfy a particular threshold value.

12. The system of claim 7, where, when selecting the first subsequent search query or the second subsequent search query, the one or more processors are further to:

select the first subsequent search query or the second subsequent search query based on a frequency of occurrence associated with the first subsequent search query and a frequency of occurrence associated with the second subsequent search query.

13. A system comprising:

one or more memory devices storing instructions; and one or more processors to execute the instructions to:

identify a plurality of audible subsequent search queries that were received from a voice recognition system after a particular audible search query received from the voice recognition system, as refinements of the particular audible search query;

identify a first quantity of terms that occur in a first set of documents that is associated with a first audible subsequent search query received from a voice recognition system, of the plurality of audible subsequent search queries;

identify a first quantity of terms that occur in the first set of documents associated with the first audible subsequent search query of the plurality of subsequent search queries;

identify a respective first weight associated with each term of the first quantity of terms that occur in the first set of documents;

identify a second set of documents that is associated with a second audible subsequent search query received from a voice recognition system, of the plurality of audible subsequent search queries;

identify a second quantity of terms that occur in the second set of documents associated with the second audible subsequent search query of the plurality of subsequent search queries;

identify a respective second weight associated with each term of the second quantity of terms that occur in the second set of documents;

generate a first term vector for the first audible subsequent search query based on the identified first set of documents and based on the respective first weight, and a second term vector for the second audible subsequent search query based on the identified second set of documents and based on the respective second weight;

cluster, based on the generated first term vector and the generated second term vector, the first audible subsequent search query into a first cluster and the second audible subsequent search query into a different, second cluster;

select a particular audible subsequent search query from one or more of the first cluster or the different, second cluster;

receive an indication that a client device has submitted an audible search query that includes the particular search query; and provide, to the client device, output through a speaker, the selected particular audible subsequent search query from the one or more of the first cluster or the different, second cluster, as a refinement of the particular audible search query submitted by the client device.

* * * * *